(12) United States Patent
Soule et al.

(10) Patent No.: US 11,310,242 B2
(45) Date of Patent: Apr. 19, 2022

(54) SYSTEM AND METHOD FOR PROTECTING NETWORK-FACING SERVICES

(71) Applicant: Raytheon BBN Technologies Corp., Cambridge, MA (US)

(72) Inventors: Nathaniel Benjamin Soule, Winchester, MA (US); Partha Pal, Boxborough, MA (US); Aaron Paulos, Somerville, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 608 days.

(21) Appl. No.: 16/248,211

(22) Filed: Jan. 15, 2019

(65) Prior Publication Data

US 2020/0228538 A1 Jul. 16, 2020

(51) Int. Cl.
*H04L 29/06* (2006.01)
*H04L 69/16* (2022.01)

(52) U.S. Cl.
CPC .......... *H04L 63/105* (2013.01); *H04L 63/101* (2013.01); *H04L 69/16* (2013.01)

(58) Field of Classification Search
CPC . H04L 63/105; H04L 63/101; H04L 63/1425; H04L 63/1416; H04L 63/14; H04L 63/1458; H04L 63/16
See application file for complete search history.

(56) References Cited

U.S. PATENT DOCUMENTS

| 8,495,725 | B2* | 7/2013 | Ahn | H04L 63/0227 726/11 |
| 2005/0022011 | A1* | 1/2005 | Swander | H04L 63/0227 726/4 |
| 2006/0195896 | A1* | 8/2006 | Fulp | H04L 63/0263 726/11 |
| 2014/0157405 | A1* | 6/2014 | Joli | H04L 63/1425 726/22 |

OTHER PUBLICATIONS

Kopparty, S. et al. "Split TCP for mobile ad hoc networks" GLOBECOM (2002), vol. 1, pp. 138-142.
Pal, P. et al. "Adaptive Resource Management Enabling Deception" (ARMED). 12th International Conference on Availability, Reliability and Security (ARES 2017). Aug. 29-Sep. 1, 2017, Reggio Calabria, Italy.
Pal, P. et al. "Disrupting Adversary Decision Logic: An Experience Report". 17th European Conference on Cyber Warfare and Security (ECCWS 2018). Jun. 28-29, 2018, Oslo, Norway.

* cited by examiner

*Primary Examiner* — Paul E Callahan
(74) *Attorney, Agent, or Firm* — Lando & Anastasi, LLP

(57) ABSTRACT

A system for performing security functions in a service-oriented computer system includes a router node configured to forward at least one packet of at least one service request to at least one server computer adapted to process the at least one service request; a first server node configured to execute, for the at least one packet, a first protocol layer of a network protocol stack, determine whether the at least one packet is compliant at the first protocol layer, and provide the at least (Continued)

one packet to a second server node responsive to determining that the at least one packet is compliant at the first protocol layer. The second server node is configured to execute, for the at least one packet, a second protocol layer of the network protocol stack, and determine whether the at least one packet is compliant at the second protocol layer.

20 Claims, 8 Drawing Sheets

SYSTEM AND METHOD FOR PROTECTING NETWORK-FACING SERVICES

STATEMENT REGARDING FEDERALLY-SPONSORED RESEARCH OR DEVELOPMENT

This invention was made with government support under Contract No. HR0011-16-C-0058 awarded by the Defense Advanced Research Projects Agency (DARPA). The U.S. government has certain rights in this invention.

APPLICABLE FIELD

The field relates generally to distributed computer systems and more specifically to security for networked distributed computer systems, in particular resiliency of network-facing server applications against denial-of-service attacks.

BACKGROUND

Computer-based systems are relied upon for many everyday services, including shopping banking, news and content delivery, and social media platforms. These services are provided to end users over a network through a client application (e.g., a web browser or other computer application in a distributed system. In recent years, it has become relatively common for hackers and other malicious actors to attempt to overwhelm a targeted computer system by making excessive demands on the computing resources used to serve the clients. For example, a hacker may launch an attack by sending repeated requests to a web-based service, which often crashes as a result of the excessive traffic. These attacks are known as denial of service (DoS) attacks. In a networked environment, an adversary can launch a coordinated DoS attack from multiple locations, known as a distributed denial-of-service (DDoS) attack.

SUMMARY

Network-facing services are vulnerable to attacks from malicious entities. For example, such entities may launch DoS and DDoS attacks against such applications by repeatedly sending requests for services, consuming system resources in order to make them unavailable to legitimate users. Attacks often target a particular implementation of a layer in the network protocol stack, such as the application layer, Internet layer, or transport layer.

Detection and mitigation mechanisms for these types of attacks have been attempted. In particular, traffic scrubbing, scaling of resources, distributed content distribution networks, and the use of alternate routing and addressing protocols have been somewhat successfully deployed against sudden, large spikes in traffic. Using such techniques, these large-scale volumetric attacks may be filtered or absorbed through distribution and instituting additional resources.

Non-volumetric "low and slow" attacks have proven more difficult to detect and defend against, as they are more difficult to disambiguate from legitimate traffic. These attacks exploit flaws or under-specified aspects of particular network protocols (or their implementations) to deny service using a low traffic volume that does not immediately draw the attention of existing security solutions. For example, in a non-volumetric attack, a very small (e.g., 10 byte) HTTP header may be endlessly written in a very slow manner (e.g., every 10 seconds), thereby consuming available web server connections and rendering the service unavailable to legitimate traffic.

Dealing with non-volumetric attacks using current approaches as described above suffer from a number of drawbacks. Many are not generalizable, and must be tied to a particular type and manner of attack. For example, many solutions rely on some form of rate limiting that involves a threshold number of packets or requests per unit of time, or a threshold size of requests or responses. Only when the threshold is exceeded does the system attempt mitigation. Yet attackers can get around such solutions by simply varying the tempo of the attack. Attempts to deal with non-volumetric attacks have also proven resistant to scaling. For example, allowing resources to be accessed only by a fixed known set of legitimate clients requires that the set constantly be kept up-to-date. Proactive attempts to deal with non-volumetric attacks also may exact too high a cost, such as by taking maneuvers that negatively impact legitimate and malicious requests alike. Finally, successful mitigation of a DoS attack is typically visible to the attacker, who may simply refocus the attack at another, more vulnerable component of the system or a related system, or may enlist more resources to increase the strength and speed of the attack.

There is an advantage to detecting and countering non-volumetric attacks that exploit flaws and misconfigurations in a network protocol layer at that protocol layer, essentially containing the impact within that layer of the network protocol stack. Yet a typical network stack is co-located with its associated service endpoint, and provides minimal isolation between the various protocol layers and the protected service itself. This arrangement allows an attack at a protocol layer to impact the entire stack, and hampers efforts to introspect protocol execution, or to inject adaptive (i.e., responsive) behaviors.

The present disclosure overcomes the drawbacks of prior approaches by splitting the network protocol stack into its component layers and optionally distributing responsibility for executing them among separate nodes in the system. By essentially splitting and moving the network protocol stack into the network itself, each layer of the stack (e.g., the application, transport, and Internet layers) can be independently executed, monitored, and adapted to respond to attacks targeting that layer. Furthermore, adaptive responses (including deceptive responses to attacks) can be more easily injected at the appropriate network layer.

In some examples, lower layers in the stack may be processed and monitored, with packets only being passed to higher layers if the processing at the lower layers was successful and did not uncover non-compliance or otherwise malicious behavior. In other examples, the packets are passed through after a quick data collection to avoid processing delay, whereas a second thread processes the collected data to detect and mitigate anomalies in a staggered manner. The present disclosure also counters attacks by selectively responding to the attack with deceptive behavior under some circumstances to misinform the adversary about the success or failure of his or her attacks. For example, a node executing a particular network layer may exhibit behavior indicating that a successful attack is underway (e.g., artificially adding delays or dropping packets randomly), thereby placating the attacker when in reality the node may have successfully detected and suppressed the attack by dropping the offending packets. In some examples, multiple nodes may be arranged in tiers, with each tier made up of nodes executing a particular layer of the protocol stack. A router may direct packets from a particular request to particular nodes in particular tiers based on load balancing, threat assessment, and other considerations.

According to one aspect, a system for performing security functions in a service-oriented computer system includes a router node configured to receive at least one service request and to forward at least one packet of the at least one service request to at least one server computer adapted to process the at least one service request; a first server node having a first processor configured to execute, for the at least one packet, a first protocol layer of a network protocol stack, determine whether the at least one packet is compliant at the first protocol layer, and provide the at least one packet to a second server node responsive to determining that the at least one packet is compliant at the first protocol layer; and the second server node having a second processor configured to execute, for the at least one packet, a second protocol layer of the network protocol stack, and determine whether the at least one packet is compliant at the second protocol layer.

According to one embodiment, the second processor of the second server node is configured to provide the at least one packet to the at least one server computer responsive to determining that the at least one packet is compliant at the second protocol layer.

According to another embodiment, the network protocol stack is an internet protocol suite, and the first protocol layer is lower in the internet protocol suite than the second protocol layer. According to a further embodiment, at least one of the first protocol layer and second protocol is an internet layer using a protocol selected from a group consisting of internet protocol (IP) and internet control message protocol (ICMP). According to a further embodiment, at least one of the first protocol layer and second protocol is a transport layer using a protocol selected from a group consisting of transmission control protocol (TCP) and user datagram protocol (UDP). According to a further embodiment, at least one of the first protocol layer and second protocol is an application layer using a protocol selected from a group consisting of hypertext transfer protocol (HTTP), HTTP/2, secure file transfer protocol (SFTP), domain name system (DNS), and transport layer security (TLS).

According to one embodiment, at least one of the first processor and the second processor is configured to determine whether the at least one packet is compliant with reference to at least one of a white list, a black list, and a rule relating to one of at least the first protocol layer and the second protocol layer.

According to another embodiment, at least one of the first processor and the second processor is configured, responsive to determining that the at least one packet is non-compliant, to take at least one action selected from a group consisting of blocking a sender of the at least one service request, sending a deceptive response to the sender of the at least one packet, modifying the at least one packet, dropping the at least one packet, delaying delivery of the at least one packet, and redirecting the at least one packet.

According to another embodiment, the first server node is a member of a first tier of server nodes each configured to execute the first protocol layer of the network protocol stack, and wherein the second server node is a member of a second tier of server nodes each configured to execute a second protocol layer of the network protocol stack. According to a further embodiment, the router node is further configured to determine, for the at least one packet, a route through the first tier of server nodes and the second tier of server nodes; select the first server node from the first tier of server nodes based on the route; and select the second server node from the second tier of server nodes based on the route. According to yet a further embodiment, the route is determined to optimize load balancing for the first tier of server nodes.

According to one embodiment, at least one of the first processor of the first server node and the second processor of the second server node is further configured to execute, for the at least one packet, a third protocol layer of a network protocol stack.

According to another aspect, a method for performing security functions in a service-oriented computer system includes intercepting at least one packet of at least one service request directed to at least one server computer adapted to process the at least one service request; executing, at a first server node, a first protocol layer of a network protocol for the at least one packet; determining whether the at least one packet is compliant at the first protocol layer; providing the at least one packet to a second server node responsive to determining that the at least one packet is compliant at the first protocol layer; executing, at the second server node, a second protocol layer of the network protocol for the at least one packet, and determining whether the at least one packet is compliant at the second protocol layer.

According to one embodiment, the method includes providing the at least one packet to the at least one server computer responsive to determining that the at least one packet is compliant at the second protocol layer. According to another embodiment, the network protocol stack is an internet protocol suite, and the first protocol layer is lower in the internet protocol suite than the second protocol layer. According to a further embodiment, at least one of the first protocol layer and second protocol is an internet layer using a protocol selected from a group consisting of internet protocol (IP) and internet control message protocol (ICMP). According to a further embodiment, at least one of the first protocol layer and second protocol is a transport layer using a protocol selected from a group consisting of transmission control protocol (TCP) and user datagram protocol (UDP). According to a further embodiment, at least one of the first protocol layer and second protocol is an application layer using a protocol selected from a group consisting of hypertext transfer protocol (HTTP), HTTP/2, secure file transfer protocol (SFTP), domain name system (DNS), and transport layer security (TLS).

According to one embodiment, the method further includes, responsive to determining that the at least one packet is non-compliant, taking at least one action selected from a group consisting of blocking a sender of the at least one service request, sending a deceptive response to the sender of the at least one packet, modifying the at least one packet, dropping the at least one packet, delaying delivery of the at least one packet, and redirecting the at least one packet.

According to another embodiment, the method further includes executing, for the at least one packet, a third protocol layer of a network protocol stack.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

A service-level entity protection architecture according to the present disclosure includes one or more server nodes each configured to execute one or more layers of the protocol stack for incoming packets directed to a service application. The server nodes operate the layers of the stack in the network, isolated from the application and optionally from other layers in the stack. In some examples, a particular node may execute only one layer at a time; in other examples, the node may execute more than one layer. A router directs network traffic to the appropriate nodes in successive order, with lower layers of the stack executed first by their respective nodes. If the packets of the traffic do not pose a threat at a lower layer, they are passed to the next highest layer, and so on, until the nodes have collectively executed the network stack in a way that is transparent to the requester—in other words, the execution of the network stack may appear, for all intents and purposes, identical to the execution of a traditional network stack co-located with the application.

The processed packets may then be passed along to the SOA application, or may first be passed to additional processes for evaluating whether they are compliant or non-compliant (e.g., potentially harmful). For example, the implementation of the isolated and/or distributed network stack may be deployed alongside other service-level entity protection architectures and techniques, such as those disclosed in U.S. patent application Ser. No. 13/407,468 (filed Feb. 28, 2012), titled "SYSTEM AND METHOD FOR PROTECTING SERVICE-LEVEL ENTITIES," now U.S. Pat. No. 9,560,011 (issued Jan. 31, 2017), as well as U.S. patent application Ser. No. 15/374,600 (filed Dec. 9, 2016), titled "SYSTEM AND METHOD FOR PROTECTING SERVICE-LEVEL ENTITIES," now U.S. Pat. No. 10,158,655 (issued Dec. 18, 2018), the disclosures of which are hereby incorporated by reference in their entireties for all purposes.

Figure 1:
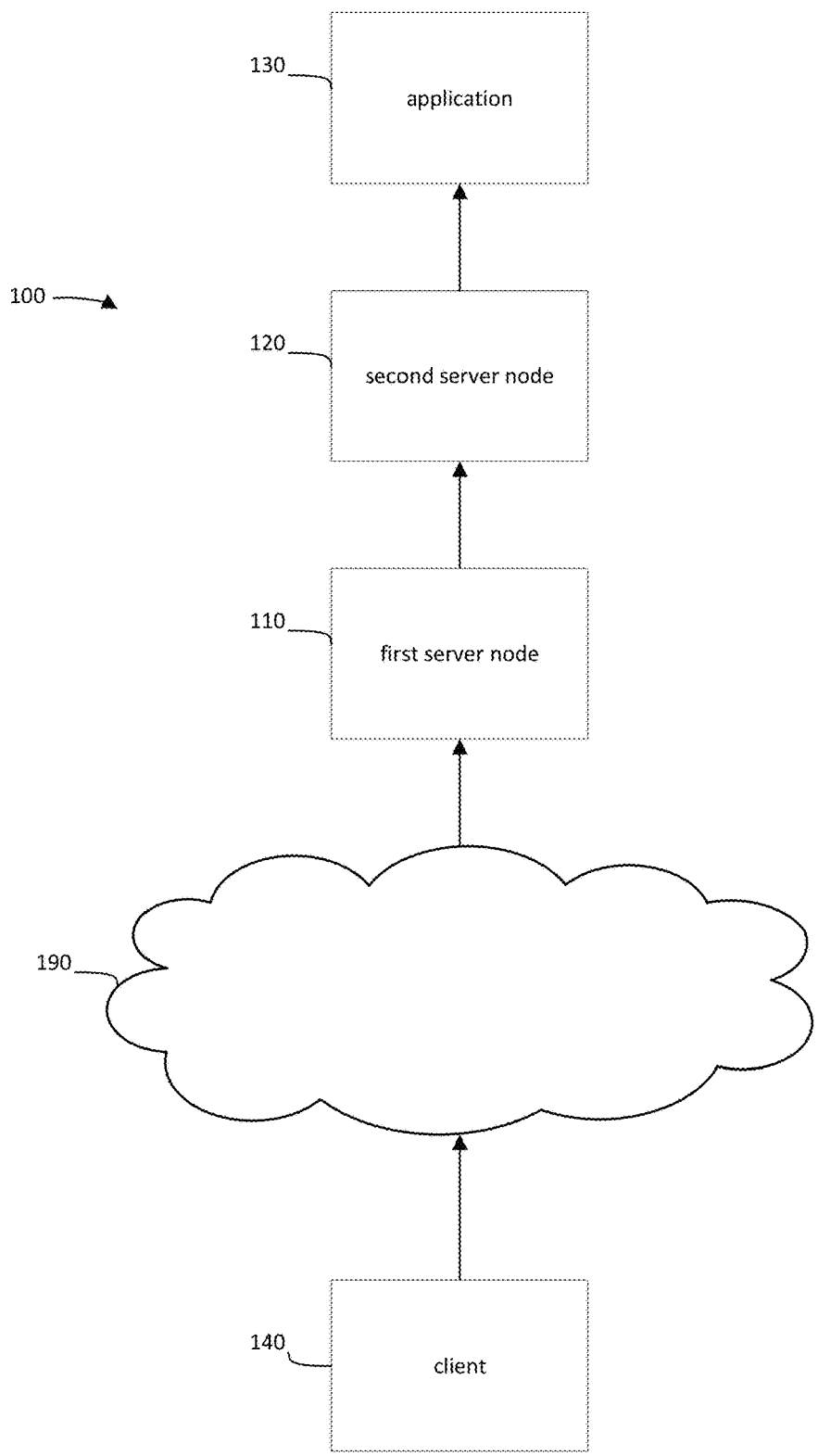
FIG. 1 is a block diagram showing a service-level entity protection architecture according to one embodiment of the present disclosure.

FIG. 1 shows a block diagram of a system 100 in accordance with one embodiment. The system 100 includes server nodes 110, 120 configured to execute one or more layers of the network protocol stack for an application 130. The server nodes 110, 120 process packets received over a network 190 (e.g., the Internet) from a client 140 that may or may not be attempting to attack the application 130 (e.g., with a DoS attack).

A client 140 may attempt to send one or more service requests to the application 130 via the network 190, in this case a packet-switched network. Before reaching the application 130, however, the data packets making up the service request 130 may be intercepted by one of server nodes 110, 120 or a router (not shown) configured to direct traffic to the server nodes 110, 120.

The server nodes 110, 120 may each execute one or more layers of the network protocol stack for traffic directed to the application 130, with lower layers in the stack being executed before higher layers in the stack. Such layers may include the application layer, transport layer, Internet layer, and/or link layer in the Internet protocol suite.

Figure 2:
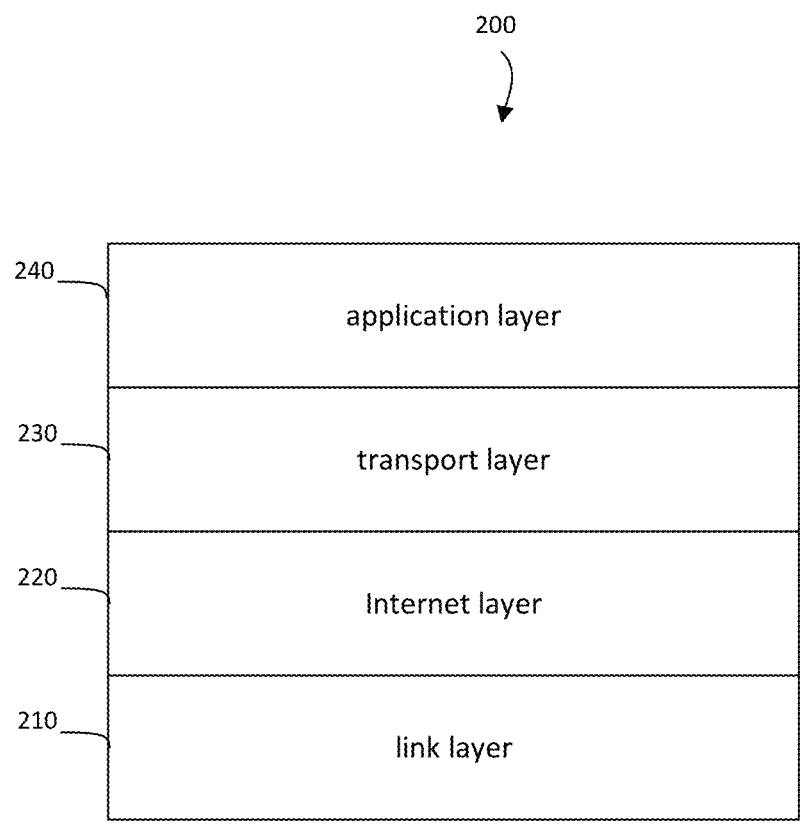
FIG. 2 shows an exemplary network protocol stack having multiple protocol layers according to one embodiment.

A model of the network protocol stack 200 of the Internet protocol suite is shown in FIG. 2. When packets are received by a system (e.g., system 100), they are processed at the lowest layer (the link layer 210 in this example) and successively move up the stack through the Internet layer 220, the transport layer 230, and the application layer 240. A packet is a formatted unit of data that consists of control information and the payload (i.e., user data). Control information provides data for delivering the payload, for example: source and destination network addresses, error detection codes, and sequencing information. Typically, control information is found in packet headers.

The link layer 210 defines the networking methods within the scope of the local network link on which hosts communicate without intervening routers. This layer includes the protocols used to describe the local network topology and the interfaces needed to effect transmission of Internet layer datagrams to neighboring hosts.

The Internet layer 220 exchanges packets across network boundaries. It provides a uniform networking interface that hides the actual topology (layout) of the underlying network connections. It is therefore also referred to as the layer that establishes internetworking, and in particular the Internet. This layer defines the addressing and routing structures used for the TCP/IP protocol suite. Protocols used in the Internet layer 220 include Internet protocol (IP) and internet control message protocol (ICMP).

The transport layer 230 performs host-to-host communications on either the same or different hosts and on either the local network or remote networks separated by routers. It provides a channel for the communication needs of applications. User datagram protocol (UDP) is a basic transport layer protocol, providing an unreliable datagram service. The transmission control protocol (TCP) provides reliable transmission of data in a connection-oriented manner along with flow control/congestion management mechanisms.

The application layer 240 is where applications create user data and communicate this data to other applications on another or the same host. The applications, or processes, make use of the services provided by the underlying, lower layers, especially the transport layer 230, which provides reliable or unreliable pipes to other processes. The application architecture includes such arrangements as the client-server model and peer-to-peer networking. The application layer 240 is the layer in which all higher-level protocols, such as SMTP, FTP, SFTP, DNS, TLS, SSH, HTTP, and HTTP/2 operate, to name just a few. Processes are addressed via ports that essentially represent services.

In prior known systems, all layers of the stack 200 are typically co-located with the application itself (e.g., application 130), with all of the attendant problems discussed above. Returning to FIG. 1, in the presently disclosed embodiments the layers are executed by at least two server nodes 110, 120 that are isolated from the application 130. The example shown includes only two nodes for ease of illustration, though it will be appreciated (and discussed in more detail) that any number of nodes may be employed. In some examples, each of the server nodes 110, 120 may execute a single layer of the stack. For example, server node 110 may execute the link layer, and may then pass the packets to server node 120, which may execute the Internet layer. The packets may be passed in modified or unmodified forms, depending on their content and their perceived threat, as discussed in more detail below. Other nodes (not shown) may in turn execute the transport layer 230 and the application layer 240. In other embodiments, one or more of server nodes 110, 120 may execute multiple layers. For example, server node 110 may execute both the link layer 210 and Internet layer 220, then may pass the packets to server node 120, which executes of the transport layer 230 and the application layer 240. Layers may be assigned and/or grouped at server nodes 110, 120 in this manner according to a number of considerations, including the nature of actual or expected threats, load balancing, network optimization, or the bandwidth or processing capacity of server nodes 110, 120.

As discussed in more detail below, the server nodes 110, 120 may communicate with each other, with the application 130, and with other components both by exchanging packets (as would be done in a traditional co-located stack) as well as by exchanging control signals, such as by self-identifying or assigning layers to be executed by the server nodes 110, 120.

Figure 3:
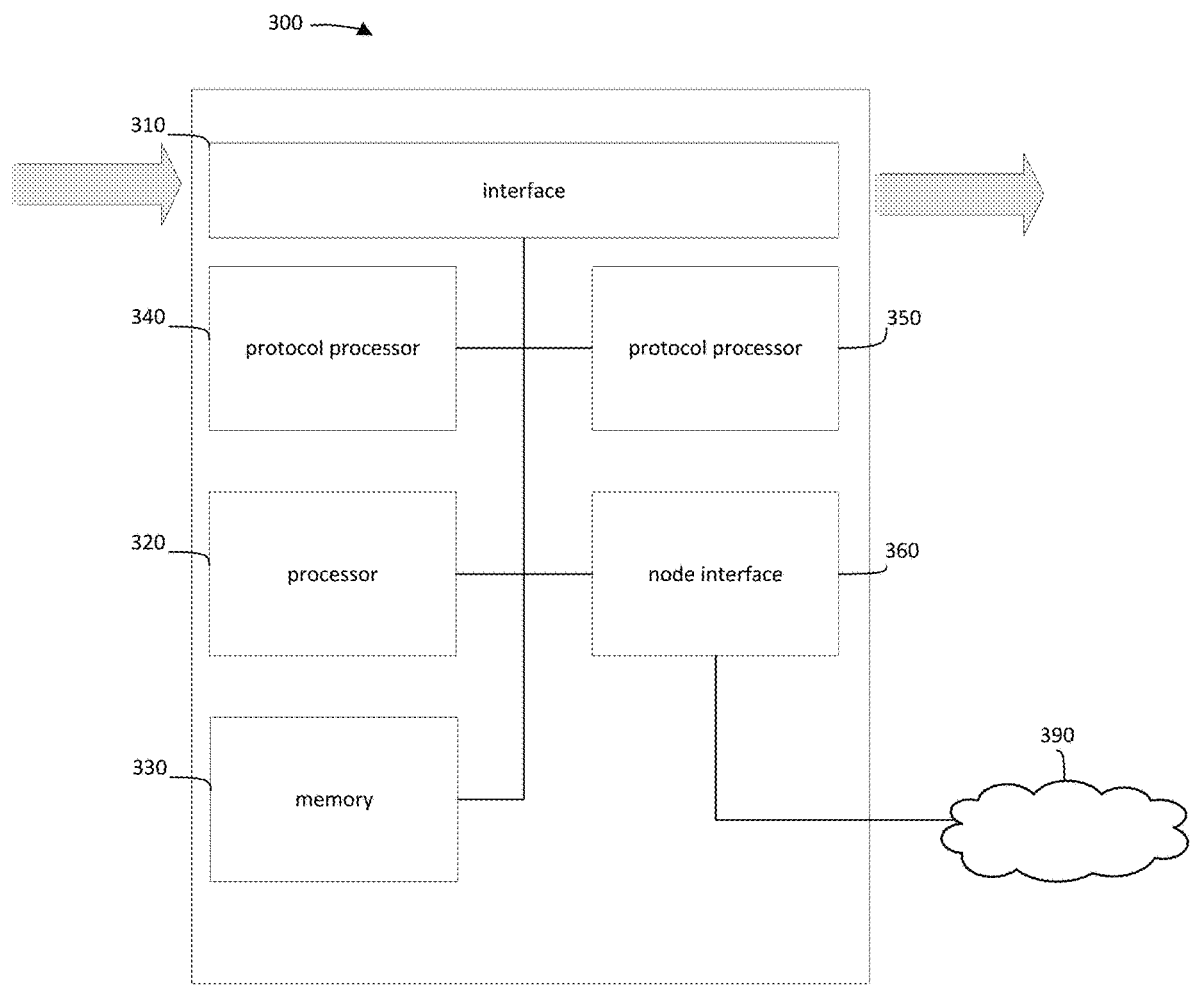
FIG. 3 is a block diagram of a server node of a service-level entity protection architecture according to one embodiment of the present disclosure.

FIG. 3 shows a block diagram of an exemplary server node 300 (e.g., server node 110, 120). The server node 300 includes a packet interface 310 for receiving a stream of packets and transmitting those packets (after any processing performed by the server node 300) to other nodes. One or more protocol processes 340, 350 are executed by a processor 320. The protocol processes 340, 350 may be able to execute any of the layers of the stack, but may be dynamic and configurable to selectively execute different layers at different times. Instructions for executing the processes 340, 350 may be stored in the memory 330. For example, configuration settings on the server node 300 may control which layer(s) should be executed by that server node 300, thereby activating or deactivating layer-specific software modules (e.g., plugins) for processes 340, 350 based on whether that layer should be executed by the node 300 or not, respectively. For example, protocol process 340 may execute the protocol for the Internet layer. Continuing the example, protocol process 350 may execute the protocol for the transport layer; in other embodiments, or may be disabled (i.e., node 300 may execute only a single layer of the stack).

For some lower-level layers of the protocol stack, the protocol may be executed by a kernel module. At higher level layers, the protocol may be executed on packets received in the user space module.

Figure 5:
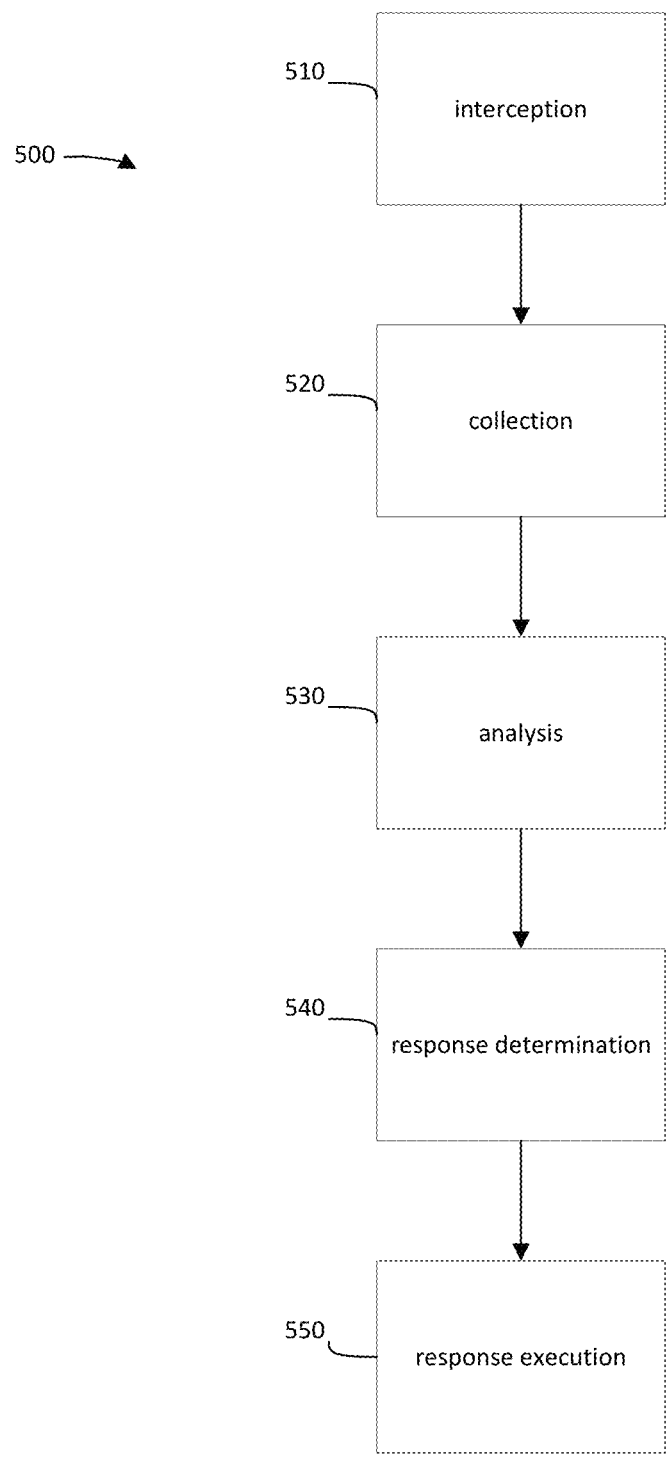
FIG. 5 depicts a process performed by a service-level entity protection architecture according to one embodiment of the present disclosure.
Figure 6:
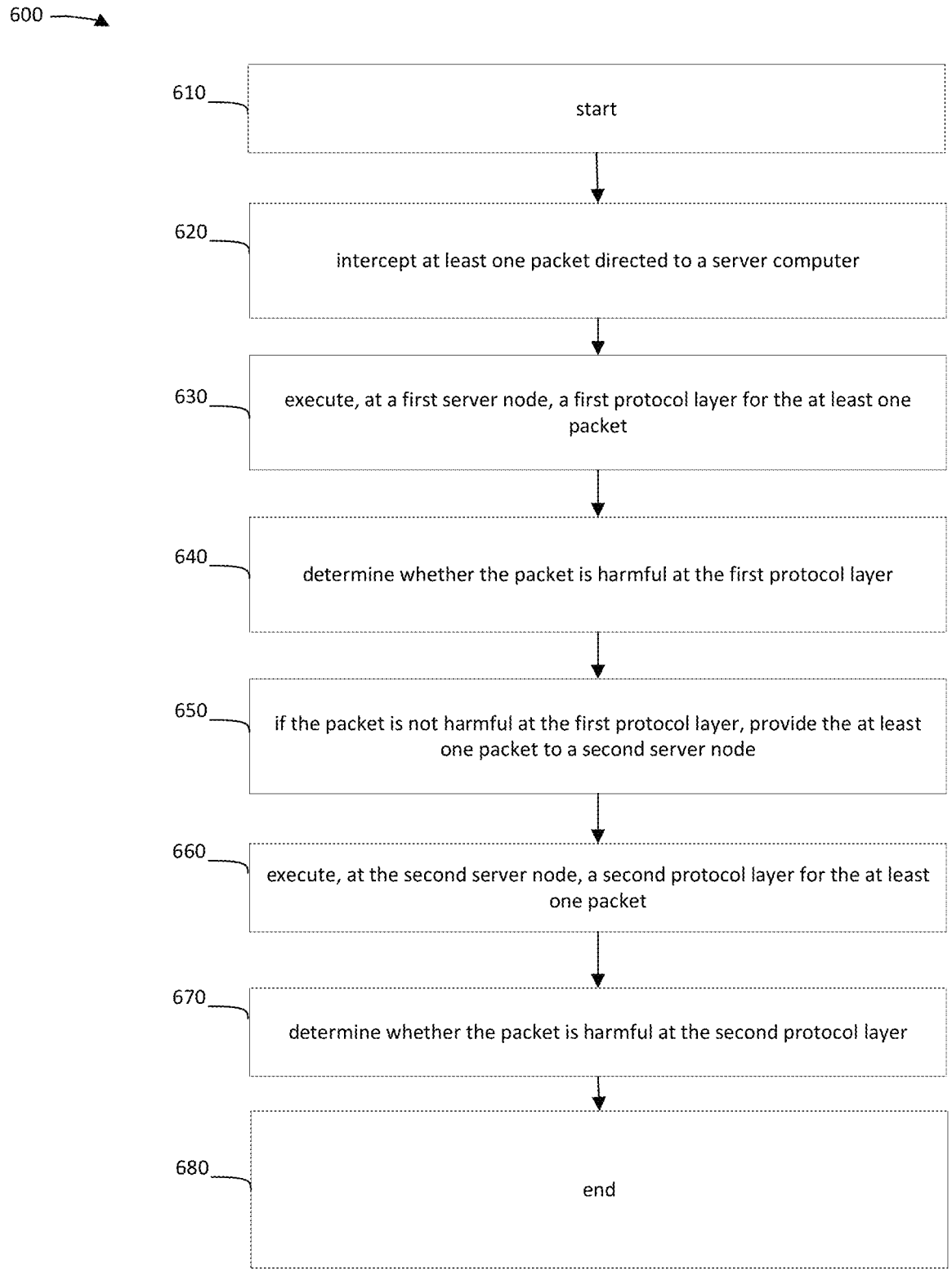
FIG. 6 depicts another process performed by a service-level entity protection architecture according to one embodiment of the present disclosure.

Processor 320 may also monitor execution of the one or more layers being executed by the node 300 to determine if the packets being received via the interface 310 pose a threat and, if so, what measures should be taken in response, as discussed in more detail with respect to FIGS. 5 and 6.

If the server node 300 receives a packet to be executed at a layer for which the server node 300 is not responsible, the server node 300 may simply act as a pass-through, passing the packet to another node unchanged via the interface 310.

A node interface 360 allows the node 300 to communicate status information and control commands with other nodes in the system. For example, another node may inform node 300 that a specific connection (source and destination pair) or source IP address is suspicious, or the node 300 may instruct a router or an external firewall to execute one or more actions like dropping packets from a source, or introducing delay. For example, the node interface 360 may create a tunnel or web socket connection or other type of connection with other nodes or with a router or other system component via a network 390.

It will be appreciated that in some embodiments, more than one server node may be configured to execute a particular protocol layer. This allows for redundancy in the event that a server node fails (either under normal conditions or during an attack), and also allows for load balancing in the system by distributing traffic for each protocol layer in an optimal (i.e., balanced) manner among various server nodes executing that protocol layer. A group of server nodes executing the same protocol layer may be arranged into a tier, with different tiers responsible for different protocol layers. A router device may be employed to intercept traffic directed to one or more services, and to redistribute the packets to the appropriate node/tier.

Figure 4:
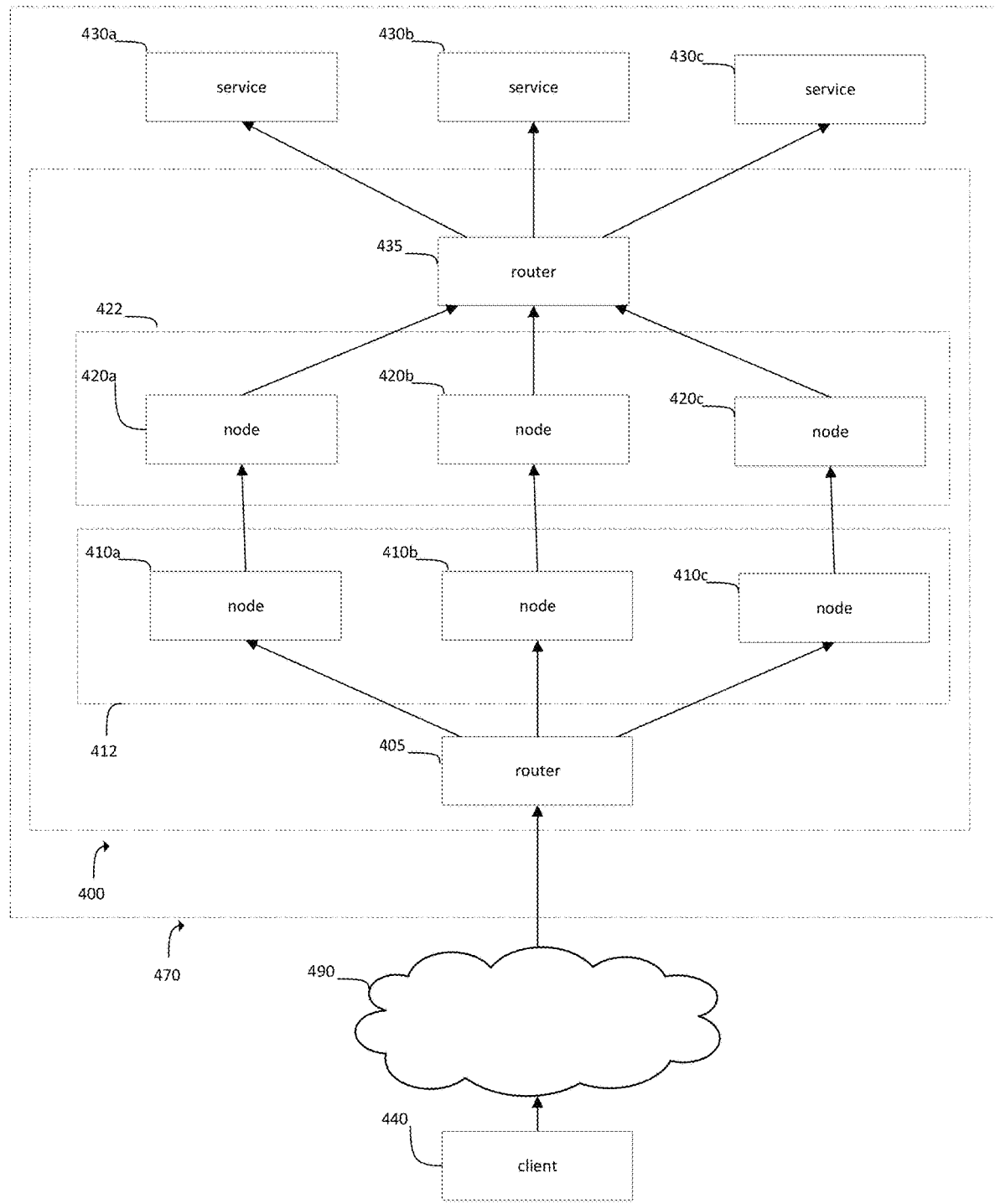
FIG. 4 is a block diagram showing a service-level entity protection architecture according to one embodiment of the present disclosure.

FIG. 4 shows a distributed system 400 in which a router 405 intercepts one or more requests from a client 440 received over a network 490, and selectively distributes the packets of the request(s) to nodes 410a-c of first tier 412, and to nodes 420a-c of second tier 422. For example, the nodes 410a-c of first tier 412 may be configured to execute a transport layer protocol (e.g., TCP protocol), and the nodes 420a-c of second tier 422 may be configured to subsequently execute an application layer protocol (e.g., HTTP protocol).

The traffic directed to one of applications 430a-c enters a protected zone 470 through the router 405. The router 405 may be responsible for selecting which node within the first tier 412 should process a current packet or stream of packets. The router 405 may orchestrate the flow of packets to a server node (e.g., node 410a) executing a network protocol in the first tier. If no threat is detected from the packets at the first protocol layer, that server node may cause the packet to subsequently be passed to and processed by another node (e.g., node 420b) in the second tier 422 executing another network protocol (higher in the stack than the network protocol being executed by the first server node). In some embodiments, the server may collect data from the packet and pass it to the next tier, leaving the processing of the collected data to another stage of the process (as described with reference to step 530 in FIG. 5). In this description the actual physical path from a node in the first tier 412 to another node in the next second tier 422 may be through a router (e.g., router 405).

When processing of the packets is complete, information may be passed to one or more of the applications 430a-c, either directly from a node or via a router 435.

In the example shown in FIG. 4, each node 410a-c in the first tier 412 may be in communication with every node 420a-c in the second tier 422, to allow for packets to flow from tier to tier via any node suitable for processing the packets. In other examples, a node in a given tier (e.g., the first tier 412) may be associated and in communication with a particular node or subset of nodes in other tiers (e.g., the second tier 422) such that packets travel a defined path through the tiers 412, 422. In another example, a router (not shown) may be positioned between adjacent tiers in order to dynamically direct the flow of packets.

In some examples, all packets from a particular request or from a particular source may be processed by the same node. A node in a particular protocol layer (e.g., node 410a) may employ logic to select which of the available next tier nodes it should send a particular packet or stream of packets to. For session-oriented protocols, all packets in the same session may be sent to the same next layer node (e.g., node 420a). For example, a General Routing Encapsulation (GRE) tunnel may be established between nodes (e.g., node 410a and node 420a), which may be physically connected through a router or other network device.

It will be appreciated that only two tiers are shown in FIG. 4 for ease of illustration, but that any number of tiers and/or nodes may be employed without departing from the spirit of the present disclosure. For example, system 400 may employ four tiers, one for each protocol layer in the internet protocol suite. In yet another example, more than one tier may execute a particular protocol stack, with tiers brought into and out of service as needed or desired.

In addition to the responsibilities performed by a traditional (i.e., co-located) stack, server nodes (e.g., node 300) may also collect information about and analyze the packets being processed in order to detect and counter harmful network traffic. An exemplary process flow 500 is shown in FIG. 5. A server node (e.g., node 300) may perform some or all of these acts 510-560, which may be customized depending on the network protocol layer being executed by the node and other factors.

At act 510, packets intended for the application (e.g., application 430a-c) are intercepted by the node or other system components (e.g., router 405). Interception allows inspection or manipulation to occur before sending the data on to the next node or tier. Traffic may be intercepted using any number of techniques including library interposition, packet capture, packet hooking, device driver interpositioning, and the like. In order to appear transparent to both the client and the service in an interaction, the node acts as a transparent proxy, receives data not intended for it, and relays it (potentially modified) as if the packets originated with the initial sender. Policy based-routing and the Linux proxy mechanism may be used to achieve this interception and transparent relay at the internet (e.g., IP) layer.

At act 520, data collection on the packets and their source is performed. This phase of processing is protocol specific and depends both on the nature of the protocol and the nature and location of the collection point. The protocol will dictate which attributes may serve as anomaly indicators, while the mechanism and location of collection may determine what data is available. Data collected may come directly from the packets themselves, and may also be determined from metadata, such as by measuring inter-packet delays, the state the protocol implementation believes the protocol to be in, and the like.

At act 530, analysis can be performed on the collected packets and associated metadata. For example, measurements collected can be examined for anomalies, either absolute or with reference to a known benign packet or pattern of traffic. Network protocols, especially at the application layer, are often under-specified, leaving open the possibility that they may be exploited. The system may use fast unsupervised and semi-supervised learning techniques that allow discovery of new attacks based on their manifestations, and may do so with a soft-real-time constraint. The system may implement anomaly detectors based on clustering, and may include support for Principal Components Analysis (PCA), and one-class Support Vector Machines (SVMs). Each of these techniques allows the system to profile some baseline traffic sample, calculate a baseline metric, and compare that metric against newly received data (i.e., packets).

In one example, a clustering approach is employed. Given initial benign traffic samples, the system selects a plausible number of latent clusters, and may measure the similarity of an object to its own cluster (cohesion) compared to other clusters (separation). In one example, a silhouette value is used as a metric. The system may then split benign traffic samples into windowed subsamples, then assign the points in all subsamples to clusters, creating a set of histograms. The distance between all pairs of histograms is calculated using a metric such as Bhattacharyya distance or distance correlation to get a baseline "benign" distance equal to the maximum pairwise distance. As new data arrive, new test histograms are created and compared to the training set, flagging data as anomalous if distance significantly exceeds baseline benign distance.

At act 540, the system relies on the analysis performed at step 530 to determine what adaptive responses, if any, a node should take in response to a perceived or actual threat, and at act 550, the adaptive response is executed. The adaptive response may be injected into the network traffic at an appropriate network layer for the nature of the threat. The system may also consider other indicators, such as CPU load or open file descriptors, to estimate how likely it is that the system is currently under attack. Adaptive responses may include blacklisting or otherwise blocking the source of the packets, such that later packets are ignored; dropping the packet; delaying delivery of the packet, either pending further analysis or to frustrate a DoS attack; or redirecting the packet to another system for further analysis or response, or for deception (e.g., by redirecting the request to a honeypot). The system can detect and thwart attacks that manipulate protocol state transitions before they impact the service endpoints. The system can also provide path diversity by forwarding well-behaved connections through different ANAs, improving network utilization and introducing dynamism that stops attacks seeking to exploit stable network paths.

The nature and forcefulness of the response may be determined by the type of attack or suspected attack that is detected. For example, a DoS attack will not affect a system unless and until numerous packets are received, so in the early stages of a suspected attack the system may err on the side of processing the packets normally while further monitoring and analysis is performed.

The system may also engage in deceptive adaptive techniques in order to mislead the sender of the packets regarding the nature or characteristics of the system, or the success of the attack. For example, the packet may be dropped, and a response may be sent to its sender that indicates the attack is working successfully. In another example, the node may respond to pings for non-existent hosts, delay responses to give the appearance of a successful attack degrading service, or hide a subset of real hosts. The system may pose as the endpoint for connection requests, and may advertise non-existent endpoints, open ports, false protocol settings, false timing information, and the like, for adversaries that probe the network. The system may use these techniques to neutralize and deceive attackers who attempt to exploit unenforced or loosely enforced protocol requirements (e.g., size field and actual payload size should match) or that operate outside expected normal usage (e.g., temporal irregularities typical of low and slow DoS attack classes). In these cases, the ANAs will provide realistic but false responses, with minimal impact on legitimate users.

FIG. 6 shows steps of a method 600 of performing security functions to defend network-facing servers and other components to be protected (e.g., the components in the protected zone 470 in FIG. 4) used for processing network protocol layers. The method includes an act 620 of intercepting at least one packet of at least one service request directed to at least one server computer adapted to process the at least one service request; an act 630 of executing, at a first server node, a first protocol layer of a network protocol for the at least one packet; an act 640 of determining whether the at least one packet is harmful at the first protocol layer; an act 650 of providing the at least one packet to a second server node responsive to determining that the at least one packet is not harmful at the first protocol layer; an act 660 of executing, at the second server node, a second protocol layer of the network protocol for the at least one packet, and an act 670 of determining whether the at least one packet is harmful at the second protocol layer.

Method 600 begins at act 610.

At act 620, the system intercepts at least one packet of at least one service request directed to at least one server computer adapted to process the at least one service request. As discussed above, interception allows inspection or manipulation to occur before sending the data on to the next node or tier. Traffic may be intercepted using any number of techniques including library interposition, packet capture, packet hooking, device driver interpositioning, and the like. Policy based-routing and the Linux proxy mechanism may be used to achieve this interception and transparent relay at the internet (e.g., IP) layer.

At act 630, a first server node executes a first protocol layer of a network protocol for the at least one packet. As noted, the server node is intended to be transparent to both client and service. Each entity may interact with the node in a manner that is indistinguishable from how the entity would interact with a traditional co-located stack. In particular, the node accesses control information in the packet that provides data for delivering the payload, for example: source and destination network addresses, error detection codes, and sequencing information. Typically, control information is found in packet headers and trailers.

At act 640, it is determined whether the at least one packet is harmful at the first protocol layer, analysis can be performed on the collected packets and associated metadata. For example, packets and or measurements concerning the packets can be examined for anomalies, including by using unsupervised and semi-supervised learning techniques, including clustering approaches, as discussed above with respect to act 530.

At act 650, the at least one packet is provided to a second server node responsive to determining that the at least one packet is not harmful at the first protocol layer.

At act 660, the second server node executes a second protocol layer of the network protocol for the at least one packet, in a manner similar to that described at act 630.

At act 670, it is determined whether the at least one packet is harmful at the second protocol layer. In a manner similar to that described at act 640 and act 530.

Method 600 ends at act 680.

Example Computer Implementations

Processes described above are merely illustrative embodiments of systems that may be used to execute security operations. Such illustrative embodiments are not intended to limit the scope of the present invention, as any of numerous other implementations exist for performing the invention. None of the claims set forth below are intended to be limited to any particular implementation of protecting service-level entities in a distributed computer system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C #, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to partially or fully automate extending offers to users and redeeming offers according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. A computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS X Snow Leopard, MAC OS X Lion operating systems available from Apple Computer, the Solaris Operating System available from Oracle Corporation, iOS, Blackberry OS, Windows 7 Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database available from MongoDB Inc.) or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 7:
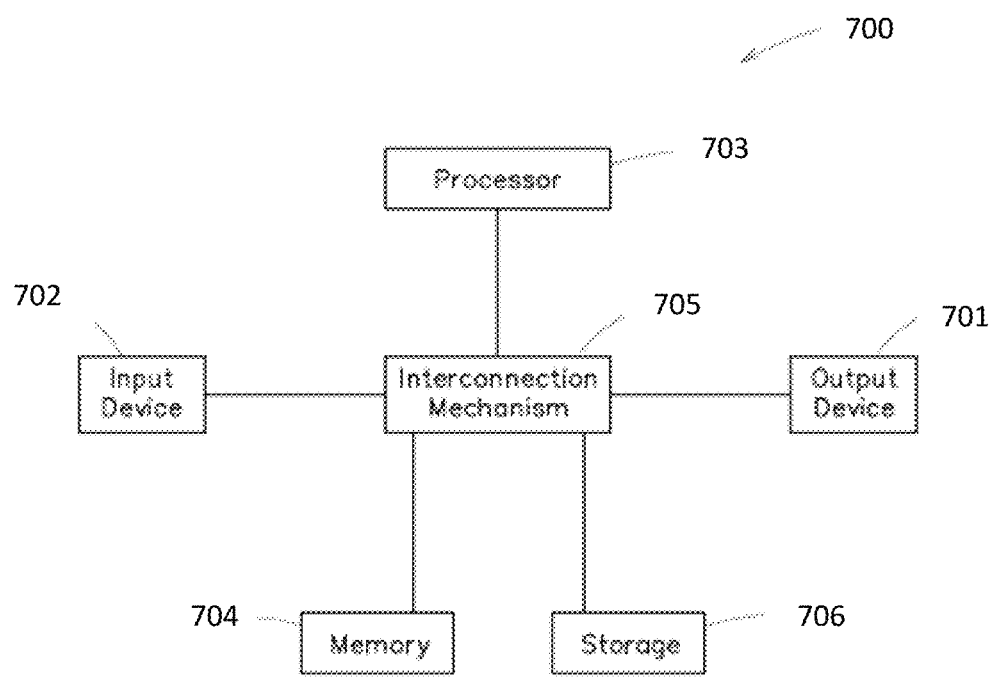
FIG. 7 shows an example computer system with which various aspects of the invention may be practiced.
Figure 8:
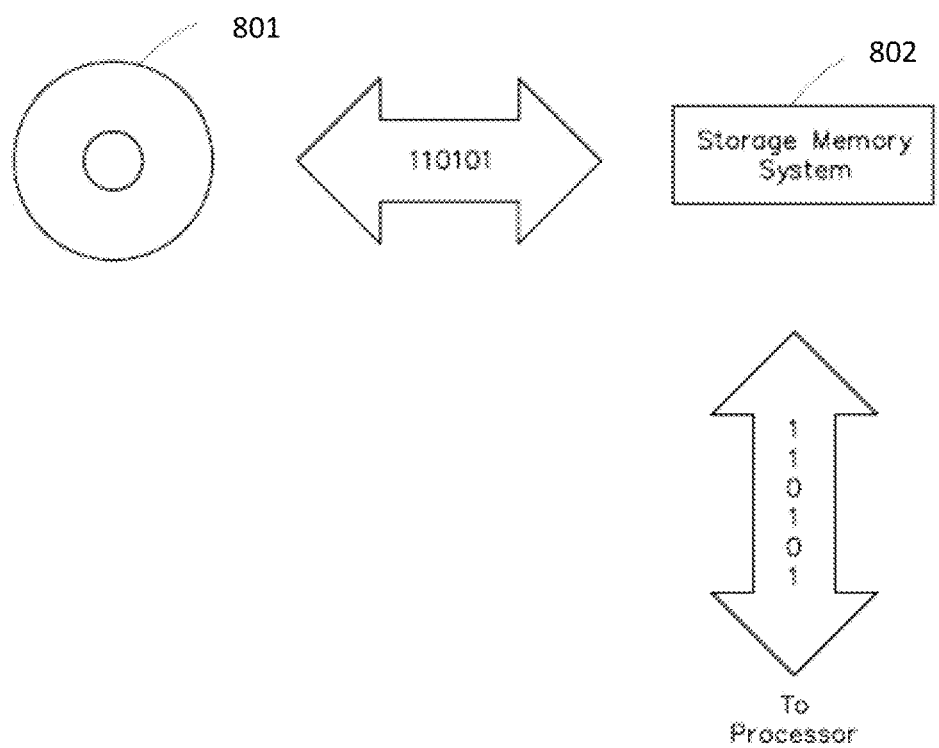
FIG. 8 shows an example storage system capable of implementing various aspects of the present disclosure.

Any number of systems of distributed system 100, 300, and 400 may be implemented on a computer system described below in relation to FIGS. 7 and 8. In particular, FIG. 7 shows an example computer system 700 used to implement various aspects. FIG. 8 shows an example storage system that may be used.

System 700 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to partially or fully automate integration of the security services with the other systems and services according to various embodiments of the invention. Further, the software design system may be located on a single computer or may be distributed among a plurality of computers attached by a communications network.

For example, various aspects of the invention may be implemented as specialized software executing in a general-purpose computer system 700 such as that shown in FIG. 7. The computer system 700 may include a processor 703 connected to one or more memory devices 704, such as a disk drive, memory, or other device for storing data. Memory 704 is typically used for storing programs and data during operation of the computer system 700. Components of computer system 700 may be coupled by an interconnection mechanism 705, which may include one or more busses (e.g., between components that are integrated within a same machine) and/or a network (e.g., between components that reside on separate discrete machines). The interconnection mechanism 705 enables communications (e.g., data, instructions) to be exchanged between system components of system 700. Computer system 700 also includes one or more input devices 702, for example, a keyboard, mouse, trackball, microphone, touch screen, and one or more output devices 701, for example, a printing device, display screen, and/or speaker. In addition, computer system 700 may contain one or more interfaces (not shown) that connect computer system 700 to a communication network (in addition or as an alternative to the interconnection mechanism 705).

The storage system 706, shown in greater detail in FIG. 8, typically includes a computer readable and writeable nonvolatile recording medium 801 in which signals are stored that define a program to be executed by the processor or information stored on or in the medium 801 to be processed by the program. The medium may, for example, be a disk or flash memory. Typically, in operation, the processor causes data to be read from the nonvolatile recording medium 801 into another memory 802 that allows for faster access to the information by the processor than does the medium 801. This memory 802 is typically a volatile, random access memory such as a dynamic random-access memory (DRAM) or static memory (SRAM). It may be located in storage system 706, as shown, or in memory system 704, not shown. The processor 703 generally manipulates the data within the integrated circuit memory 704, 802 and then copies the data to the medium 801 after processing is completed. A variety of mechanisms are known for managing data movement between the medium 801 and the integrated circuit memory element 704, 802, and the invention is not limited thereto. The invention is not limited to a particular memory system 704 or storage system 706.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the invention may be practiced, it should be appreciated that aspects of the invention are not limited to being implemented on the computer system as shown in FIG. 7. Various aspects of the invention may be practiced on one or more computers having a different architecture or components that that shown in FIG. 7.

Computer system 700 may be a general-purpose computer system that is programmable using a high-level computer programming language. Computer system 700 may be also implemented using specially programmed, special purpose hardware. In computer system 700, processor 703 is typically a commercially available processor such as the well-known Pentium, Core, Core Vpro, Xeon, or Itanium class processors available from the Intel Corporation. Many other processors are available. Such a processor usually executes an operating system which may be, for example, the Windows NT, Windows 2000 (Windows ME), Windows XP, Windows Vista or Windows 7 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 Mobile or Android OS operating systems, or UNIX available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C # (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com (Seattle, Wash.), among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for performing security functions in a service-oriented computer system, the system comprising:
    a router node configured to receive at least one service request and to forward at least one packet of the at least one service request to at least one server computer adapted to process the at least one service request;
    a first server node having a first processor configured to execute, for the at least one packet, a first protocol layer of a network protocol stack,
        determine whether the at least one packet is compliant at the first protocol layer, and
        provide the at least one packet to a second server node responsive to determining that the at least one packet is compliant at the first protocol layer; and the second server node having a second processor configured to
    execute, for the at least one packet, a second protocol layer of the network protocol stack, and
        determine whether the at least one packet is compliant at the second protocol layer.

2. The system of claim 1, wherein the second processor of the second server node is configured to provide the at least one packet to the at least one server computer responsive to determining that the at least one packet is compliant at the second protocol layer.

3. The system of claim 1, wherein the network protocol stack is an internet protocol suite, and the first protocol layer is lower in the internet protocol suite than the second protocol layer.

4. The system of claim 3, wherein at least one of the first protocol layer and second protocol layer is an internet layer using a protocol selected from a group consisting of internet protocol (IP) and internet control message protocol (ICMP).

5. The system of claim 3, wherein at least one of the first protocol layer and second protocol layer is a transport layer using a protocol selected from a group consisting of transmission control protocol (TCP) and user datagram protocol (UDP).

6. The system of claim 3, wherein at least one of the first protocol layer and second protocol layer is an application layer using a protocol selected from a group consisting of hypertext transfer protocol (HTTP), HTTP/2, secure file transfer protocol (SFTP), domain name system (DNS), and transport layer security (TLS).

7. The system of claim 1, wherein at least one of the first processor and the second processor is configured to determine whether the at least one packet is compliant with reference to at least one of a white list, a black list, and a rule relating to one of at least the first protocol layer and the second protocol layer.

8. The system of claim 1, wherein at least one of the first processor and the second processor is configured, responsive to determining that the at least one packet is non-compliant at the first protocol layer or the second protocol layer, to take at least one action selected from a group consisting of blocking a sender of the at least one service request, sending a deceptive response to the sender of the at least one packet, modifying the at least one packet, dropping the at least one packet, delaying delivery of the at least one packet, and redirecting the at least one packet.

9. The system of claim 1, wherein the first server node is a member of a first tier of server nodes each configured to execute the first protocol layer of the network protocol stack, and wherein the second server node is a member of a second tier of server nodes each configured to execute a second protocol layer of the network protocol stack.

10. The system of claim 9, wherein the router node is further configured to:
    determine, for the at least one packet, a route through the first tier of server nodes and the second tier of server nodes;
    select the first server node from the first tier of server nodes based on the route; and
    select the second server node from the second tier of server nodes based on the route.

11. The system of claim 10, wherein the route is determined to optimize load balancing for the first tier of server nodes.

12. The system of claim 1, wherein at least one of the first processor of the first server node and the second processor of the second server node is further configured to execute, for the at least one packet, a third protocol layer of a network protocol stack.

13. A method for performing security functions in a service-oriented computer system, the method comprising:
    intercepting at least one packet of at least one service request directed to at least one server computer adapted to process the at least one service request;
    executing, at a first server node, a first protocol layer of a network protocol for the at least one packet;
    determining whether the at least one packet is compliant at the first protocol layer;
    providing the at least one packet to a second server node responsive to determining that the at least one packet is compliant at the first protocol layer;
    executing, at the second server node, a second protocol layer of the network protocol for the at least one packet; and
    determining whether the at least one packet is compliant at the second protocol layer.

14. The method of claim 13, further comprising providing the at least one packet to the at least one server computer responsive to determining that the at least one packet is compliant at the second protocol layer.

15. The method of claim 13, wherein the network protocol stack is an internet protocol suite, and the first protocol layer is lower in the internet protocol suite than the second protocol layer.

16. The method of claim 15, wherein at least one of the first protocol layer and second protocol layer is an internet layer using a protocol selected from a group consisting of internet protocol (IP) and internet control message protocol (ICMP).

17. The method of claim 15, wherein at least one of the first protocol layer and second protocol layer is a transport layer using a protocol selected from a group consisting of transmission control protocol (TCP) and user datagram protocol (UDP).

18. The method of claim 15, wherein at least one of the first protocol layer and second protocol layer is an application layer using a protocol selected from a group consisting of hypertext transfer protocol (HTTP), HTTP/2, secure file transfer protocol (SFTP), domain name system (DNS), and transport layer security (TLS).

19. The method of claim 13, further comprising, responsive to determining that the at least one packet is non-compliant at the first protocol layer or the second protocol layer, taking at least one action selected from a group consisting of blocking a sender of the at least one service request, sending a deceptive response to the sender of the at least one packet, modifying the at least one packet, dropping the at least one packet, delaying delivery of the at least one packet, and redirecting the at least one packet.

20. The method of claim 13, further comprising executing, for the at least one packet, a third protocol layer of a network protocol stack.

* * * * *